US012452103B2

United States Patent
Wan et al.

(10) Patent No.: US 12,452,103 B2
(45) Date of Patent: Oct. 21, 2025

(54) COMBINED PFCP SESSION MODEL FOR NETWORK ACCESS BY RESIDENTIAL GATEWAYS

(71) Applicant: Nokia Solutions and Networks Oy, Espoo (FI)

(72) Inventors: Kenneth Wan, Ottawa (CA); Killian De Smedt, Antwerp (BE); Sanjay Wadhwa, Sunnyvale, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 259 days.

(21) Appl. No.: 17/873,635

(22) Filed: Jul. 26, 2022

(65) Prior Publication Data
US 2024/0039762 A1    Feb. 1, 2024

(51) Int. Cl.
H04L 12/66 (2006.01)
H04L 9/40 (2022.01)
H04L 45/02 (2022.01)

(52) U.S. Cl.
CPC .............. *H04L 12/66* (2013.01); *H04L 45/02* (2013.01); *H04L 63/0236* (2013.01); *H04L 63/08* (2013.01)

(58) Field of Classification Search
CPC ..... H04L 12/66; H04L 45/02; H04L 63/0236; H04L 63/08; H04L 12/2878; H04L 12/2858; H04W 88/16
See application file for complete search history.

(56) References Cited

U.S. PATENT DOCUMENTS

| 11,675,946 | B1 | 6/2023 | Waters |
| 2006/0274743 | A1 | 12/2006 | Yegin et al. |
| 2017/0142032 | A1 | 5/2017 | Heinonen et al. |
| 2019/0335002 | A1 | 10/2019 | Bogineni et al. |
| 2020/0213156 | A1 | 7/2020 | Cheng et al. |
| 2020/0336564 | A1 | 10/2020 | Kholmyansky et al. |
| 2021/0076257 | A1* | 3/2021 | Pocha .................... H04W 76/15 |
| 2021/0092585 | A1 | 3/2021 | Jaju et al. |

(Continued)

FOREIGN PATENT DOCUMENTS

| CN | 113852588 A | 12/2021 |
| EP | 3989673 A1 | 4/2022 |
| WO | 2020/072652 A1 | 4/2020 |

OTHER PUBLICATIONS

Japanese Notice of Refusal Corresponding to Application No. 2023-191274, dated Nov. 15, 2024.
Broadband Forum, "TR-470 5G Wireless Wireline Convergence Architecture," 3GPP Draft. 3rd generation Partnership Project, p. 33, Aug. 4, 2020.
"LTE; 5G; Interface between the control Plane and the User Plane nodes (3GPP TS 29.244 version 15.9.0 Release 15)," vol. 3Gpp CT, No. V15.9.0, pp. 1-205, Jul. 31, 2020.

(Continued)

*Primary Examiner* — Jung H Park
(74) *Attorney, Agent, or Firm* — Harness, Dickey & Pierce, P.L.C.

(57) ABSTRACT

A network element includes an aggregate gateway function having a control plane and a separate user plane. The network element is configured to: establish a packet forwarding control protocol session between the residential gateway and the network; and facilitate network access by the residential gateway according to the packet forwarding control protocol session. The packet forwarding control protocol session hosts (i) a first set of forwarding rules for forwarding control messages between the control plane and the separate user plane and (ii) at least one second set of forwarding rules for forwarding data traffic between the control plane and the separate user plane.

19 Claims, 5 Drawing Sheets

(56) References Cited

U.S. PATENT DOCUMENTS

| | | |
|---|---|---|
| 2021/0127271 A1 | 4/2021 | Wu |
| 2021/0160759 A1 | 5/2021 | Muthusamy et al. |
| 2021/0360742 A1 | 11/2021 | Liao et al. |
| 2022/0038311 A1 | 2/2022 | Shen et al. |
| 2022/0061129 A1 | 2/2022 | Pani et al. |
| 2022/0095196 A1* | 3/2022 | Yang ............... H04W 40/02 |
| 2022/0353336 A1 | 11/2022 | Cañete Martinez et al. |
| 2023/0136134 A1 | 5/2023 | Uppili et al. |
| 2023/0139272 A1* | 5/2023 | Niu ............... H04L 45/566 709/238 |
| 2023/0156091 A1 | 5/2023 | Poscic et al. |
| 2023/0164881 A1 | 5/2023 | Velev et al. |
| 2023/0171320 A1 | 6/2023 | Zhang et al. |

OTHER PUBLICATIONS

"TR-456 AGF Functional Requirements," 3GPP Draft, R3-204642, 3rd Generation Partnership Project, p. 100, Aug. 3, 2020.

Extended European Search Report for European Application No. 23187912.3 mailed Dec. 11, 2023.

"Control and User Plane Separation for a disaggregated BNG" Broadband Forum, Jun. 2020, p. 1-102.

Broadband Forum, "TR-459 Control and User Plane Separation for a disaggregated BNG," 3GPP Draft, C4-203064, May 14, 2020.

Extended European Search Report for European Application No. 23202473.7 mailed Mar. 18, 2024.

Extended European Search Report for European Application No. 23187906.5 mailed Dec. 11, 2023.

* cited by examiner

COMBINED PFCP SESSION MODEL FOR NETWORK ACCESS BY RESIDENTIAL GATEWAYS

TECHNICAL FIELD

One or more example embodiments relate to methods, apparatuses, and/or non-transitory computer-readable storage mediums for providing network access to residential gateways.

BACKGROUND

Third Generation Partnership Project (3GPP) 5th generation (5G) technology is a next generation of radio systems and network architecture that can deliver extreme broadband and ultra-robust, low latency connectivity. 5G technology improves a variety of telecommunication services offered to the end users and helps to support massive broadband that delivers gigabytes of bandwidth per second on demand for both uplink and downlink transmissions.

In general, a 5G network may support IP services, such as IP television (IPTV) services for instance for a residential gateway (RG), such as a $5^{th}$ Generation-RG (5G-RG) or a Fixed Network-RG (FN-RG) served by the 5G Core (5GC).

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

At least one example embodiment provides mechanisms to enable a combined PFCP session model in which a PFCP session includes sets of forwarding rules for both control messages (or signaling) and data traffic (data packets) for one or more packet data unit (PDU) sessions between a residential gateway and a 5th Generation Core network (5GC) concurrently and/or simultaneously. In one example, forwarding rules for both control signaling and one or a plurality of PDU sessions may be combined into a single PFCP session.

Utilizing the combined PFCP session model, according to example embodiments, may reduce consumption of resources by PFCP sessions by reducing the number of separate PFCP sessions for network access by a residential gateway (RG), such as a 5G-RG. Additionally, or alternatively, by combining control signaling and PDU sessions into a single PFCP session, scaling on both the Aggregate Gateway Function-Control Plane (AGF-CP) and the AGF-User Plane (AGF-UP) may be improved, PFCP sessions may be used more efficiently and/or management of PFCP sessions may be simplified (e.g., for Internet Service Providers (ISPs) providing basic high speed Internet access).

One or more example embodiments also provide mechanisms to enable selective use of the separate PFCP session model or the combined PFCP session model based on policy.

At least one example embodiment provides a method for network access (e.g., wireless core network access) by a residential gateway in a control and user plane separation architecture, the control and user plane separation architecture including a control plane and a separate user plane, and the residential gateway configured for both wired and wireless communication via the network (e.g., wireless core network), the method comprising: establishing, via an aggregate gateway function, a packet forwarding control protocol session between the residential gateway and the network, the packet forwarding control protocol session hosting (i) a first set of forwarding rules for forwarding control messages between the control plane and the separate user plane and (ii) at least one second set of forwarding rules for forwarding data traffic between the control plane and the separate user plane; and facilitating, via the aggregate gateway function, network access by the residential gateway according to the packet forwarding control protocol session.

At least one other example embodiment provides a network element to facilitate network access by a residential gateway in a control and user plane separation architecture, the control and user plane separation architecture including an aggregate gateway function having a control plane and a separate user plane, and the residential gateway configured for both wired and wireless communication via the network, the network element comprising: at least one processor and at least one memory including computer program code. The at least one memory and the computer program code are configured to, with the at least one processor, cause the network element to: establish a packet forwarding control protocol session between the residential gateway and the network, the packet forwarding control protocol session hosting (i) a first set of forwarding rules for forwarding control messages between the control plane and the separate user plane and (ii) at least one second set of forwarding rules for forwarding data traffic between the control plane and the separate user plane; and facilitate network access by the residential gateway according to the packet forwarding control protocol session.

At least one other example embodiment provides a network element to facilitate network access by a residential gateway in a control and user plane separation architecture, the control and user plane separation architecture including an aggregate gateway function having a control plane and a separate user plane, and the residential gateway configured for both wired and wireless communication via the network, the network element comprising: means for establishing a packet forwarding control protocol session between the residential gateway and the network, the packet forwarding control protocol session hosting (i) a first set of forwarding rules for forwarding control messages between the control plane and the separate user plane and (ii) at least one second set of forwarding rules for forwarding data traffic between the control plane and the separate user plane; and means for facilitating network access by the residential gateway according to the packet forwarding control protocol session.

At least one other example embodiment provides a non-transitory computer-readable storage medium storing computer-executable instructions that, when executed by one or more processors at a network element including an aggregate gateway function, cause the network element to perform a method for network access by a residential gateway in a control and user plane separation architecture, the control and user plane separation architecture including a control plane and a separate user plane, and the residential gateway configured for both wired and wireless communication via the network, the method comprising: establishing, via an aggregate gateway function, a packet forwarding control protocol session between the residential gateway and the network, the packet forwarding control protocol session hosting (i) a first set of forwarding rules for forwarding control messages between the control plane and the separate user plane and (ii) at least one second set of forwarding rules for forwarding data traffic between the control plane and the separate user plane; and facilitating, via the aggregate gateway function, network access by the residential gateway according to the packet forwarding control protocol session.

According to one or more example embodiments, pre-authentication of the residential gateway to the network may be performed after receipt of an initiation message from the residential gateway. The packet forwarding control protocol session may be established after the residential gateway has been pre-authenticated to the network.

After the pre-authentication, the determination that a single packet forwarding control protocol session is to be used to host the first set of forwarding rules and the at least one second set of forwarding rules may be made, and the packet forwarding control protocol session may be established after determining that the single packet forwarding control protocol session is to be used.

The packet forwarding control protocol session for hosting the first set of forwarding rules may be established, and the packet forwarding control protocol session may be modified to add the at least one second set of forwarding rules.

The packet forwarding control protocol session may be modified upon receipt of a packet data unit session request message. The packet data unit session request message may request a packet data unit session between the residential gateway and the network.

The aggregate gateway function may include an aggregate gateway function user plane and an aggregate gateway function control plane. The first set of forwarding rules may include forwarding rules for forwarding the control messages between the aggregate gateway function user plane and the aggregate gateway function control plane.

The at least one second set of forwarding rules may include forwarding rules for forwarding the data traffic between the aggregate gateway function user plane and the aggregate gateway function control plane.

The establishing of the packet forwarding control protocol session for hosting the first set of forwarding rules may include exchanging packet forwarding control protocol session establishment messages between the aggregate gateway function user plane and the aggregate gateway function control plane; and the modifying may include exchanging packet forwarding control protocol session modification messages between the aggregate gateway function user plane and the aggregate gateway function control plane.

The exchanging packet forwarding control protocol session modification messages may include: sending a packet forwarding control protocol session modification request message from the aggregate gateway function control plane to the aggregate gateway function user plane upon receipt of a packet data unit session request message, the packet data unit session request message requesting a packet data unit session between the residential gateway and the network; and sending a packet forwarding control protocol session modification response message from the aggregate gateway function user plane to the aggregate gateway function control plane.

At least one packet data unit session for network access by the residential gateway may be established after modifying the packet forwarding control protocol session.

IP addresses and prefixes for network access by the residential gateway may be obtained from the network.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of a function or network element such as a network node, AGF, server, etc., it should be understood that one or more example embodiments discussed herein may be performed by one or more processors (or processing circuitry) at the applicable device, apparatus, network node, network element, or system. For example, according to one or more example embodiments, at least one memory may include or store computer program code, and the at least one memory and the computer program code may be configured to, with at least one processor, cause the network element to perform the operations discussed herein.

As discussed herein, the term "mechanism," in addition to its plain and ordinary meaning, may refer to methods, apparatuses and/or non-transitory computer readable storage mediums where applicable.

As discussed herein, the terminology "one or more" and "at least one" may be used interchangeably.

It will be appreciated that a number of example embodiments may be used in combination.

As discussed herein, the term "subscriber" refers to the purchaser or subscriber of broadband services, and which utilizes a residential gateway to access the services. The term "user" refers to users of customer premises equipment (CPE) that send and receive user traffic through the residential gateway. Although used in this way for the sake of clarity, a user may also be referred to as a subscriber.

As discussed herein, a packet data unit (PDU) session refers to an IP based PDU session. An IP based PDU session (sometimes referred to as an IP session) refers to an IP connection established between a residential gateway (e.g., a 5th Generation-Residential Gateway (5G-RG) or a Fixed Network-Residential Gateway (FN-RG)) and a wireless core network, such as a 5GC, where the wireless core network assigns the residential gateway one or more IP addresses to use for transmission and reception of traffic (e.g., data and control traffic). In operation, a residential gateway utilizes the assigned IP address(es) or IP prefix(es) to connect to the internet (or other data network). In at least some instances, a residential gateway may obtain several different IP addresses/prefixes for each type of service, wherein each represents a different IP Session. IP based PDU sessions include a single IPv4 session, a single IPv6 session or a single dual stack IP session. Although discussed herein with regard to IP sessions for example purposes, example embodiments should not be limited to these examples. Rather, example embodiments may be applicable to other PDU session types.

In a 5G architecture, the PFCP protocol is used to program traffic forwarding rules from the control plane or control plane function (e.g., Aggregate Gateway Function-Control Plane (AGF-CP)) to the user plane or user plane function (e.g., AGF-User Plane (AGF-UP)) and vice-versa. Each set of traffic forwarding rules that can be used for one or more PDU sessions from a single residential gateway is referred to as a PFCP session.

Generally, the control plane is responsible for maintaining session states and providing instructions to the user plane. The user plane is responsible for moving packets through the system from ingress to egress by following the traffic rules programmed by the control plane, and independently interacting with other nodes in the network through various routing protocols (e.g., Ethernet Virtual Private Network (EVPN), Border Gateway Protocol (BGP), Interior Gateway Protocol (IGP), etc.).

In the context of wireline access to the 5GC, residential gateways, such as 5G-RGs and FN-RGs, may be served by the 5GC. A 5G-RG acts as a full 3GPP User Equipment that is assumed to terminate 3GPP NAS signaling and to support URSP policy rules sent by the 5GC to User Equipment. A Fixed Network RG (FN-RG) is unmodified for the sake of accessing the 5GC, and utilizes a wireline access entity (W-AGF) that terminates control signaling (e.g., 3GPP NAS signaling, including the NAS signaling carrying URSP rules) on behalf of the unmodified FN-RGs.

Figure 1:
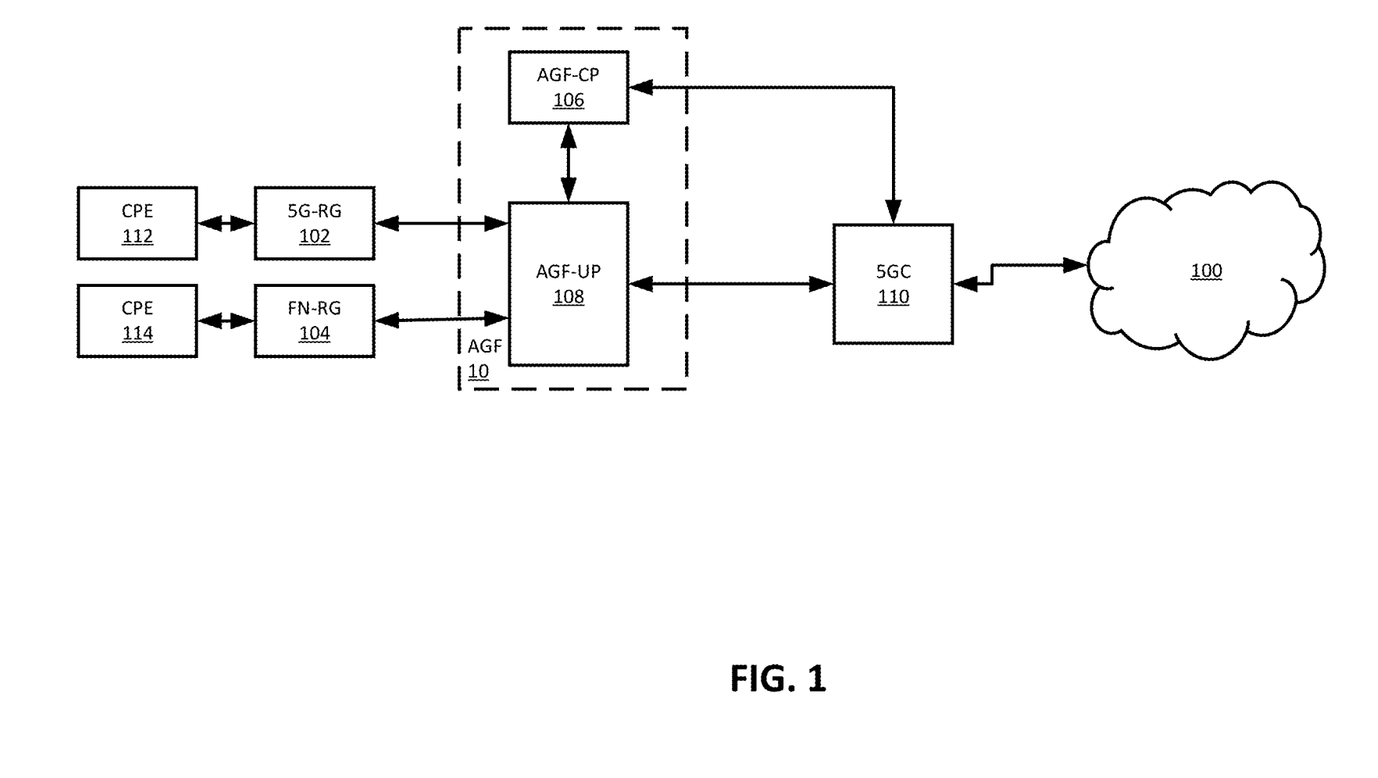
FIG. 1 is a block diagram illustrating a portion of a system architecture for wireless core network access, according to example embodiments.

FIG. 1 is a block diagram illustrating a portion of a system architecture for wireless core network access by a 5G-RG and a FN-RG, according to example embodiments. In the example shown in FIG. 1, the system architecture incorporates a control and user separation (CUPS) architecture.

Referring to FIG. 1, the communications network includes a 5G Residential Gateway (5G-RG) 102, a Fixed-Network Residential Gateway (FN-RG) 104, an Aggregate Gateway Function (AGF) node 10, a wireless core network 110 and a Data Network (DN), such as the Internet 100. In this example, the wireless core network 110 is a 5GC. However, example embodiments should not be limit to the example embodiments discussed herein.

The 5G-RG 102 is a residential gateway that connects one or more customer premises equipment (CPE) 112 to the Internet (or other data network) 100 through the 5GC 110. The 5G-RG 102 registers and authenticates with the 5GC 110 through the use of standard mobile 3GPP procedures. The 5G-RG 102 processes control messages (e.g., 3GPP NAS messages) from the 5GC 110 and Access Stratum (AS) messages from the AGF 10.

Once authenticated with the 5GC 110, the 5G-RG 102 may be assigned one or more IP addresses upon request. The 5G-RG 102 may either utilize the assigned IP address as the Network Address Translation (NAT) public address (e.g., for IPv4) or assign the prefixes directly to the end user equipment (e.g., for IPv6).

As discussed herein, a CPE device is understood to be a hardware device or equipment typically located at the home or business of a customer. Example CPE devices may include terminals or electronic devices such as mobile phones, laptops, computers, tablets, WiFi access points, WiFi extenders, fixed wireless access units, Small Cell devices, or the like.

The FN-RG 104 is a residential gateway that connects one or more CPE 114 to the Internet (or other data network) 100 either through a conventional broadband network or through the 5GC 110. In the context of 5G, the FN-RG 104 registers and authenticates with the 5GC 110, via the AGF 10, to gain access to the 5GC 110. Once authenticated with the 5GC 110, the FN-RG 104 may request one or more IP addresses. The FN-RG 104 may either utilize the assigned IP address as the NAT public address (e.g., for IPv4) or assign the prefixes directly to the end user equipment (e.g., for IPv6). The FN-RG 104 may process and send conventional broadband Quality of Service (QoS) parameters, but rely on the AGF 10 to translate between standard broadband QoS parameters and 5G QoS parameters. The FN-RG 104 may connect to the AGF 10 via any wireline technology (e.g., DSL, PON, Cable, etc.).

The 5G-RG 102 and/or the FN-RG 104 may support multiple services, such as IPTV. In some embodiments, IPTV can be defined as multimedia services, such as television, video, audio, textual media, graphics, data, combinations thereof, and/or the like that are delivered over IP-based networks supporting the required level of QoS, Quality of Experience (QoE), security, interactivity, reliability, or the like.

As discussed herein, the 5G-RG 102 and the FN-RG 104 may sometimes be collectively referred to as RGs 102/104.

Both the 5G-RG 102 and the FN-RG 104 are connected to the 5GC 110 via a gateway (or gateway function) referred to as the AGF 10. The AGF 10 is a function added to a wireline access network (e.g., a Wireline 5G Access Network (W-5GAN)) that enables and/or allows connectivity to the 5GC 110 via wireline networks.

The AGF 10 is disaggregated to separate the control plane (AGF-Control Plane (AGF-CP) 106) and the user plane (AGF-User Plane (AGF-UP) 108). This architecture is referred to as control and user plane separation (CUPS). CUPS enables flexible network deployment and operation through distributed or centralized deployment and independent scaling between control plane and user plane functions, without affecting the functionality of the existing nodes subject to the split.

In addition to the functionality discussed herein, the AGF-CP 106 handles control plane signaling for both 5G control messages, packets or signaling and wireline control messages, packets or signaling to and from the 5G-RG 102 and/or FN-RG 104. For example, the AGF-CP 106 programs the AGF-UP 108 with forwarding rules via the PFCP such that control and signaling packets from the 5G-RG 102 and/or FN-RG 104 are redirected from the AGF-UP 108 to the AGF-CP 106 via the control packet redirect interface (CPR interface). The AGF-CP 106 communicates with the 5GC 110 via the N2 interface.

Once the 5G-RG 102 and/or the FN-RG 104 is registered and authenticated with the 5GC 110, the 5G-RG 102 and/or FN-RG 104 may request establishment of a PDU session. The 5GC 110 provides this access and informs the AGF-CP 106 about the General Packet Radio Service (GPRS) Tunneling Protocol-tunnel endpoint ID (GTP-TEID) that the 5G-RG 102 and/or FN-RG 104 are to use to connect to (send and receive packets to and from) the 5GC 110 for the PDU session. The AGF-CP 106 programs the forwarding rules at the AGF-UP 108 via the state control interface (SCi) utilizing the PFCP protocol to provide a data path for the 5G-RG 102 and/or the FN-RG 104 to and from the 5GC 110. Instructions on data forwarding per PDU session are based on instructions received from the AGF-CP 106 through the SCi utilizing the PFCP protocol.

The 5GC 110 is a subscriber management infrastructure that provides access to the Internet (or other data network) 100 on a per subscriber basis. The 5GC 110 is specified by the 3GPP. The AGF-CP 106 connects to the Access Mobility and Management Function (AMF) (not shown) in the 5GC 110 and the AGF-UP 108 connects to the User Plane Function (UPF) (not shown) in the 5GC 110.

Figure 2:
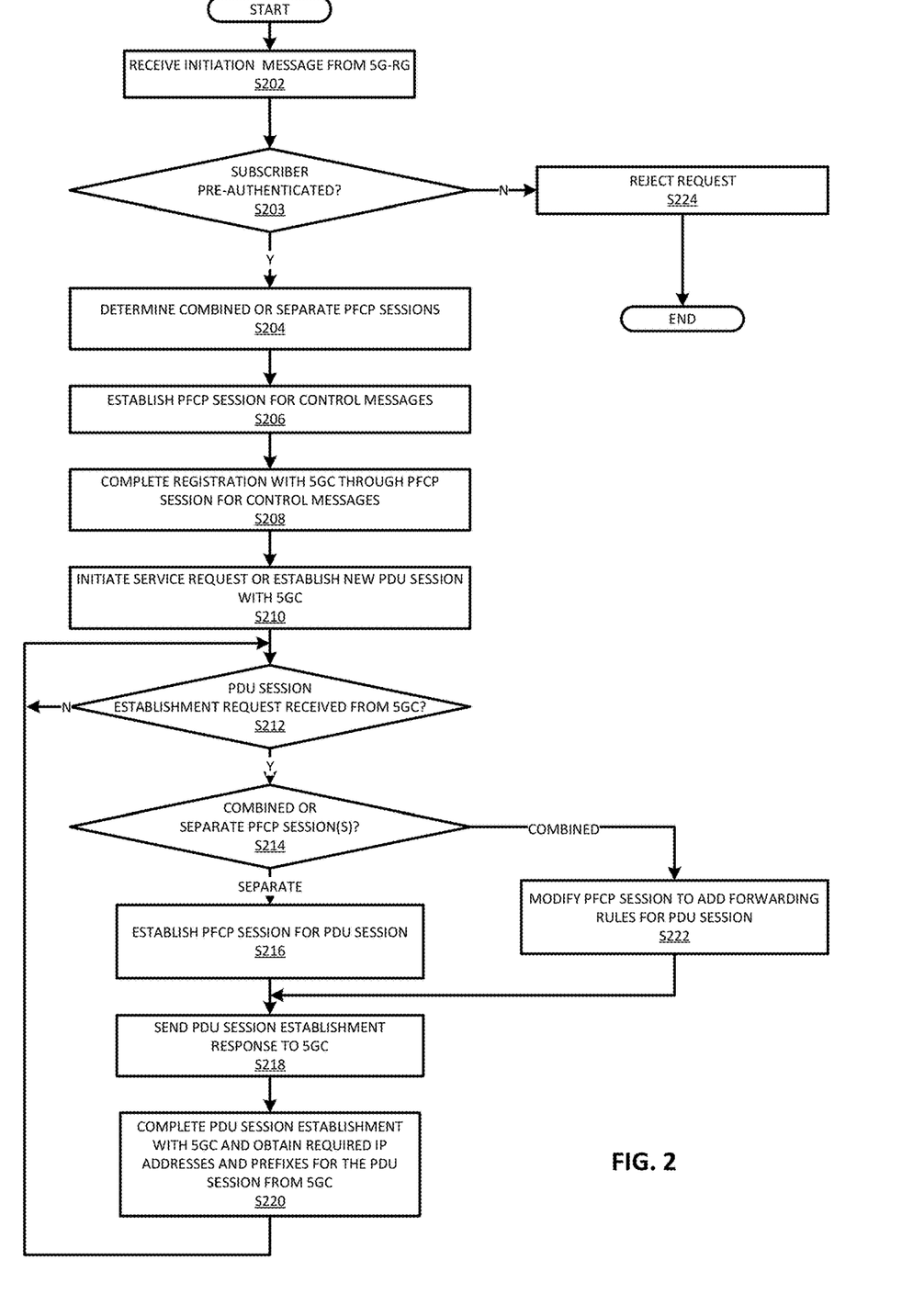
FIG. 2 is a flow chart illustrating a method according to example embodiments.

FIG. 2 is a flow chart illustrating an example embodiment of a method for wireless core network access by a residential gateway in a control and user plane separation architecture. In the method shown in FIG. 2, the AGF 10 determines whether to utilize the separate PFCP session model or the combined PFCP session model according to policy. Accordingly, the method shown in FIG. 2 enables selective utilizing of the separate PFCP session model or the combined PFCP session model.

For example purposes, the method shown in FIG. 2 will be discussed with regard to the architecture shown in FIG. 1 and with regard to an IP based PDU session (referred to more simply herein as a PDU session). However, example embodiments should not be limited to this example.

In some instances, the method shown in FIG. 2 will be discussed with regard to operations being performed at the AGF 10. It should be understood, however, that one or more of these operations may be performed at the AGF-UP 108 and/or the AGF-CP 106 as discussed later with regard to FIGS. 3 and/or 4.

Referring to FIG. 2, at step S202 the AGF 10 receives, from the 5G-RG 102, an initiation message requesting initiation of a PDU session to access the Internet (or other data network) 100 through the 5GC 110. In one example, the initiation message may be a Point-to-Point Protocol over Ethernet (PPPoE) Active Discovery Initiation (PADI) message, or other upstream control packet. As is generally known, a PADI message is broadcast packet used by a client (e.g., 5G-RG 102) to search for an active server (Access Concentrator) providing access to a desired service.

At step S203, the AGF 10 (e.g., via the AGF-CP 106) pre-authenticates the 5G-RG 102 to the 5GC 110. The pre-authentication may be performed via an authentication, authorization and accounting (AAA) server, via policy server or locally. In a more specific example, using the RADIUS protocol and RADIUS servers, the AGF 10 (e.g., via the AGF-CP 106) provides the authentication/policy server (not shown) in the 5GC 110 with authentication information for the 5G-RG 102 (the requesting residential gateway). The authentication information may include the logical port/system on which the initiation message was received, the name of the subscriber, the location of the logon of the 5G-RG 102 and other information obtained from, or based on, the initiation message (e.g., PADI message). The authentication/policy server may determine whether the request from the 5G-RG 102 should be accepted or rejected (e.g., based on whether a hostname matching the 5G-RG 102 exists at the authentication/policy server) and sends a response message indicating the same to the AGF 10 (e.g., via the AGF-CP 106).

In this case, if the AGF 10 receives a response message indicating that the request from the 5G-RG 102 should be rejected, then at step S224 the AGF 10 (e.g., via the AGF-CP 106) rejects the request from the 5G-RG 102 for access to the 5GC 110, indicates the same to the 5G-RG 102, and the process terminates. In one example, the initiation message may be requesting initial access to the 5GC 110. In this case, if rejected, the response message from the authentication/policy server may indicate that the 5G-RG 102 should not be granted access to the 5GC 110 and the AGF 10 may reject the request. In another example, the initiation message from the 5G-RG 102 may be requesting a second IP service, where the subscription for the 5G-RG 102 allows only a single IP service. In this case, the AGF 10 may also reject the request from the 5G-RG 102 for access to the 5GC 110. In yet another example, the initiation message may be requesting a service not provided by the 5GC 110. In this case, the AGF 10 may again reject the request.

Returning to step S203 in FIG. 2, if the 5G-RG 102 is accepted, then the authentication/policy server sends a response message indicating the same and also returns a list of attributes associated with the subscription for the 5G-RG 102. These attributes may include, for example, whether the AGF 10 should utilize the separate PFCP session model or the combined PFCP session model to establish PDU sessions, filter rules, Quality of Service (QoS) levels (e.g., whether the user traffic from the 5G-RG 102 should be treated to premium QoS), limitations on numbers of PDU sessions for the 5G-RG 102 (e.g., whether the subscriber should be limited to a single IP session), whether to process an IPTV request, etc.

According to at least one example embodiment, the authentication/policy server may provide the indication of whether the separate PFCP session model or the combined PFCP session model should be used (e.g., within the attributes) via a parameter in a string format, such as Tag, Length and Value (TLV). The parameter may be referred to a PFCP session model parameter, for example.

At step S204, the AGF 10 (e.g., via the AGF-CP 106) determines whether the separate PFCP session model or the combined PFCP model should be used for the 5G-RG 102 when accessing the 5GC 110 based on the attributes (e.g., based on the PFCP session model parameter) provided by the authentication/policy server. The AGF 10 may store this determination (or the PFCP session model parameter value) in a memory in association with an identifier, such as a subscriber identification information.

Once having determined whether the separate PFCP session model or the combined PFCP session model should be used for the 5G-RG 102, at step S206 the AGF 10 establishes an initial PFCP session between the 5G-RG 102 and the 5GC 110. In at least one example embodiment, the AGF 10 establishes the PFCP session to allow for exchanging of control signaling (or control messages) between the AGF- UP 108 and the AGF-CP 106. In one example, the control messages may be PPPoE control plane messages and/or NAS messages transported over PPP Vendor Specific Network Protocol (VSNP). As discussed in more detail later with regard to FIGS. 3 and 4, the AGF-CP 106 and the AGF-UP 108 may establish the initial PFCP session (at least initially for control signaling) by exchanging PFCP session establishment messages. According to one or more example embodiments, the established PFCP session at least initially hosts and/or includes a first set of forwarding rules for forwarding control signaling (or control messages) between the AGF-CP 106 (control plane) and the AGF-UP 108 (separate user plane).

At step S208, the 5G-RG 102 completes registration with the 5GC 110 by exchanging control messages (e.g., NAS messages or PPPoE control plain messages) according to the established PFCP session (forwarding rules). The completion of registration is generally known, and thus, a detailed discussion is omitted for the sake of brevity.

At step S210, the 5G-RG 102 initiates a service request or establishing of a new PDU session with the 5GC 110. As is generally known, a service request may be used in the case where the 5G-RG 102 needs and/or wants to re-establish the control (e.g., NAS) signaling and PDU session. In this case, the 5G-RG 102 is still registered with the 5GC 110, but may have temporarily lost connection with the AGF 10 (e.g., when a line is cut). If, however, the initiation message is requesting initial network access by the 5G-RG 102 to the 5GC 110, then at step S210 the 5G-RG 102 may establish a new (initial) PDU session with the 5GC 110. Because service request and PDU session establishment methods such as this are generally known, a detailed discussion is omitted.

At step S212, the AGF 10 (e.g., via the AGF-CP 106) determines whether a PDU session establishment request has been received from the 5GC 110. The 5GC 110 may generate and send a PDU session establishment request to the AGF 10 in response to, or based on, the initiation of the service request or PDU session from the 5G-RG 102 at S210. Because PDU session establishment requests are generally known, a detailed discussion is omitted.

In response to receiving the PDU session establishment request from the 5GC 110, at step S214 the AGF 10 (e.g., via the AGF-CP 106) determines whether to utilize the separate PFCP session model or the combined PFCP session model in establishing the requested PDU session for the 5G-RG 102. According to at least one example embodiment, the AGF 10 determines whether to utilize the separate or combined PFCP session model by referencing the decision made for the 5G-RG 102 at step S204 based on the attribute information received from the authentication/policy server during the pre-authentication process.

If the AGF 10 determines that the separate PFCP session model is to be used, then at S216 the AGF 10 establishes a separate PFCP session for the requested PDU session. The separate PFCP session includes a set of forwarding rules for forwarding data traffic between the AGF-CP 106 and the AGF-UP 108. Establishing of the separate PFCP session will be discussed in more detail later with regard to FIG. 3.

Once having established the separate PFCP session for the requested PDU session, at step S218 the AGF 10 (e.g., via the AGF-CP 106) sends a PDU session establishment response message to the 5GC 110 indicating that the separate PFCP session for the PDU session has been established. Because PDU session establishment response messages are generally known, a detailed discussion is omitted.

At step S220, the 5G-RG 102 and the 5GC 110 complete establishment of the PDU session to connect the 5G-RG 102 to the 5GC 110. Once connected, the 5G-RG 102 obtains the requisite IP address(es) and prefix(es) for the PDU session from the 5GC 110 in any suitable manner. According to example embodiments, the 5G-RG 102 may utilize the assigned one or more IP addresses as the NAT public address (e.g., for IPv4) or assign the prefixes directly to the end user equipment (e.g., for Ipv6).

Once having established the PDU session, when the separate PFCP session model is used, the AGF 10 facilitates access to the 5GC 110 by the 5G-RG 102 according to the establish PFCP session for the control messages and the separate PFCP session for the requested PDU session. The process then returns to step S212 and awaits a subsequent PDU session establishment request from the 5GC 110.

According to at least some example embodiments, the AGF 10 may establish a separate PFCP session in response to each PDU session establishment request from the 5GC 110, such that each PDU session between the 5G-RG 102 and the 5GC 110 has an associated PFCP session including a set of forwarding rules for forwarding data traffic between the AGF-CP 106 and the AGF-UP 108 to facilitate data traffic forwarding between the 5G-RG 102 and the 5GC 110, thereby facilitating network access.

By utilizing the separate PFCP session model, when the 5G-RG 102 or the 5GC 110 no longer requires the PDU session, the associated PFCP session may be deleted, without modifying other PFCP sessions for the 5G-RG 102, thereby simplifying the PFCP session logic. The separate PFCP session model may also allow for splitting PDU sessions among different AGF-UP hosts.

Returning to step S214 in FIG. 2, if the AGF 10 determines that the combined PFCP session model is to be used, then at step S222 the AGF 10 modifies the PFCP session established at step S206 to add a set of data forwarding rules for the requested PDU session, such that the modified PFCP session (e.g., single modified PFCP session for the 5G-RG 102) hosts a set of forwarding rules for forwarding control messages between the AGF-CP 106 and the AGF-UP 108 and a set of forwarding rules for forwarding data traffic for the PDU session between the AGF-CP 106 and the AGF-UP 108. As discussed in more detail later with regard to FIG. 4, the AGF-CP 106 and the AGF-UP 108 may modify the PFCP session by exchanging PFCP session modification messages with one another to add the data traffic forwarding rules for the requested PDU session.

The process then proceeds to step S218 and continues as discussed herein.

Once having established the PDU session at step S220, when the combined PFCP session model is used, the AGF 10 facilitates access to the 5GC 110 by the 5G-RG 102 according to the modified PFCP session, which hosts a set of forwarding rules for forwarding control messages between the AGF-CP 106 and the AGF-UP 108 and a set of forwarding rules for the PDU session between the 5G-RG 102 and the 5GC 110.

According to at least some example embodiments, when utilizing the combined PFCP session model, the AGF 10 may add a set of forwarding rules to the PFCP session for the 5G-RG 102 in response to each PDU session establishment request from the 5GC 110, such that the PFCP session includes a set of forwarding rules for forwarding data traffic for each PDU session requested by the 5G-RG 102 between the AGF-CP 106 and the AGF-UP 108 to facilitate data traffic forwarding between the 5G-RG 102 and the 5GC 110.

By utilizing the combined PFCP session model, when the 5G-RG 102 or the 5GC 110 no longer requires the PDU session, the PFCP session may be modified to remove the set of forwarding rules for the PDU session. Accordingly, the combined PFCP session model may simplify PFCP session management relative to the conventional art, particularly for services that require a single PDU session or few PDU sessions.

Returning to step S212 in FIG. 2, if the AGF 10 determines that a PDU session establishment request has not yet been received from the 5GC 110, then the AGF 10 awaits such a request from the 5GC 110. Once having received the PDU session establishment request, the process proceeds to step S214 and continues as discussed herein.

The example embodiment shown in FIG. 2 is discussed with regard to a pre-authentication process performed at step 203 (e.g., using the RADIUS protocol), wherein the indication of whether to utilize the separate or combined PFCP session model is included along with the response indicating that the pre-authentication is successful. However, example embodiments should not be limited to this example.

In another example, the DIAMETER protocol may be used. In this case, the AGF 10 may send, to a policy server, a policy request to fetch policy information (e.g., the above-discussed PFCP session model parameter) indicating whether the combined or separate PFCP session model should be used. In this case, pre-authentication may be optional. If pre-authentication is omitted, then steps S203 and S224 in FIG. 2 may be omitted, and the AGF 10 may determine whether to use the combined or separate PFCP session model based on the fetched policy information at step S204.

In another example, a local policy at the AGF 10 may be configured (e.g., by an operator) to utilize the combined or separate PFCP session model for (e.g., all) PDU sessions based on local logic and/or parameters (e.g., using statically configured logic or a stored PFCP session model parameter). In this case, pre-authentication may also be optional (e.g., using a local database). If pre-authentication is omitted, then steps S203 and S224 may again be omitted, and the AGF 10 may determine whether to use the combined or separate PFCP session model based on the configured local policy at step S204.

Example scenarios of FIG. 2, wherein the separate PFCP session model and the combined PFCP session model are utilized will now be described with regard to FIGS. 3 and 4, respectively. For the sake of brevity, similar or the same discussion set forth above with regard to FIG. 2 will not be repeated with regard to FIGS. 3 and 4.

For example purposes, FIGS. 3 and 4 will be discussed with regard to example embodiments including a pre-authentication process. As discussed above, however, example embodiments should not be limited to this example. Rather, the pre-authentication may be optional in, for example, instances where a policy fetch or local policy configuration is used.

Figure 3:
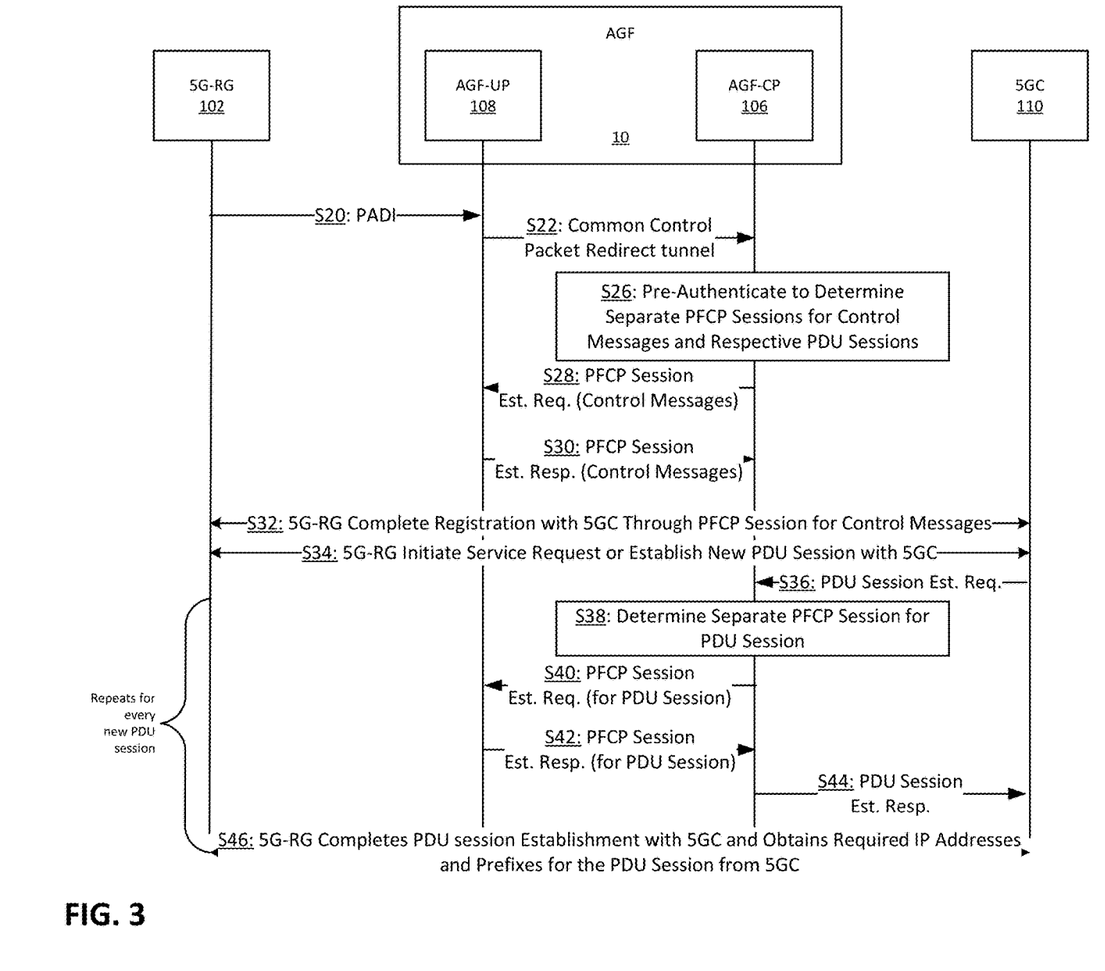
FIG. 3 is a signal flow diagram illustrating another method according to example embodiments.
Figure 4:
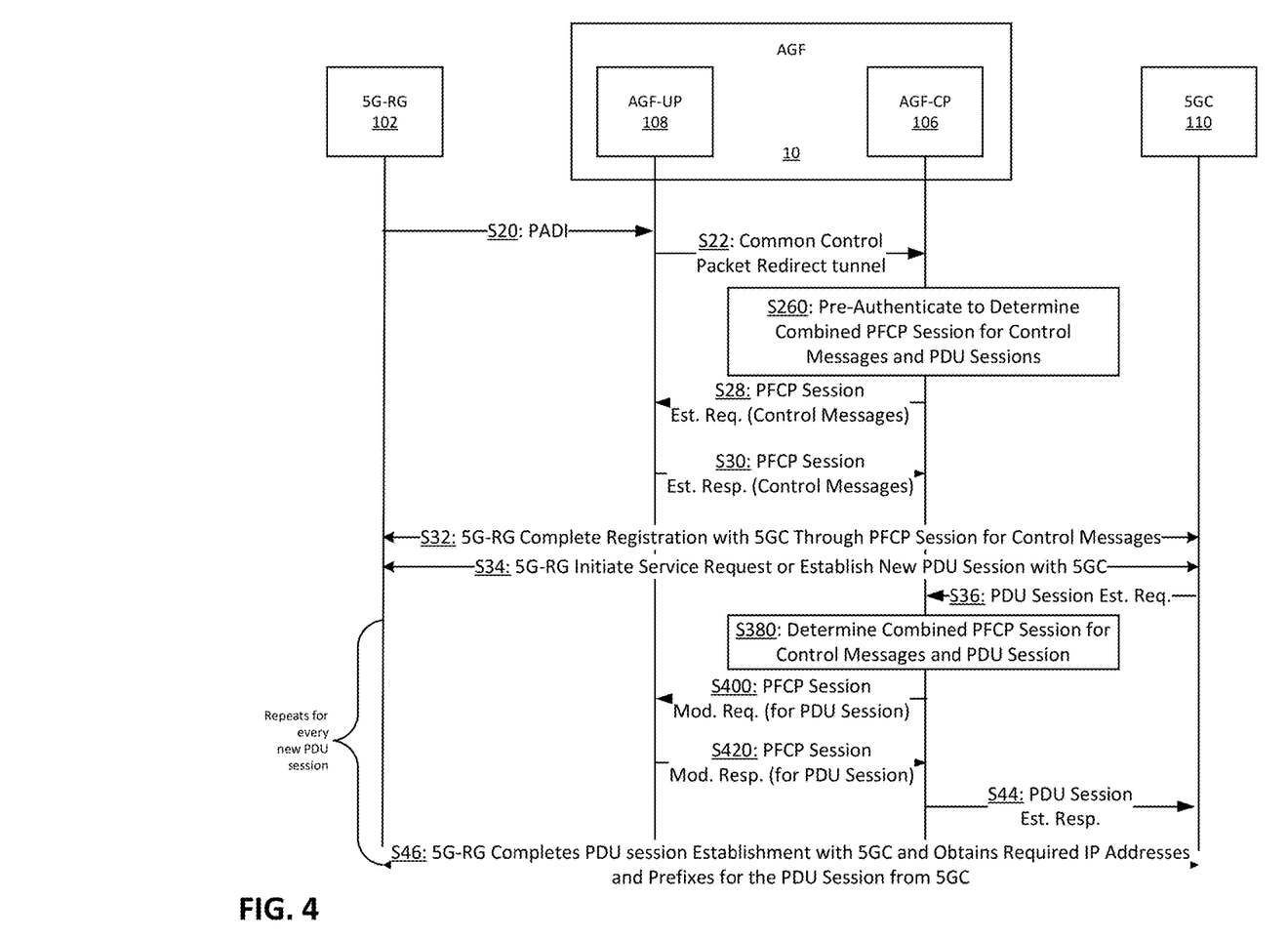
FIG. 4 is a signal flow diagram illustrating yet another method according to example embodiments.

FIG. 3 is a signal flow diagram illustrating a method for network access utilizing the separate PFCP session model, according to example embodiments.

Referring to FIG. 3, at S20 the AGF-UP 108 receives an initiation (e.g., PADI) message from the 5G-RG 102 requesting network access (e.g., to the Internet 100) via the 5GC 110. Upon receipt, at S22 the AGF-UP 108 forwards the initiation message to the AGF-CP 106 via a common control packet redirect tunnel between the AGF-UP 108 and the AGF-CP 106.

At S26, the AGF-CP 106 performs the pre-authentication discussed above with regard to step S203 in FIG. 2, and determines that the separate PFCP session model should be used for network access by the 5G-RG 102 to the 5GC 110 as discussed above with regard to step S204 in FIG. 2.

After determining that the separate PFCP session model is to be used (e.g., for the 5G-RG 102), as discussed above with regard to S206 in FIG. 2, the AGF 10 establishes a PFCP session including a set of forwarding rules for control messages between the 5G-RG 102 and the 5GC 110. In at least this example, once having established the PFCP session at the AGF-CP 106, at S28 the AGF-CP 106 outputs a PFCP session establishment request message (PFCP Session Est. Req.) to the AGF-UP 108. Based on the PFCP session establishment request message, the AGF-UP 108 establishes the PFCP session at the AGF-UP 108. The AGF-UP 108 then outputs a PFCP session establishment response message (PFCP Session Est. Resp.) to the AGF-CP 106 at S30, indicating that the PFCP session has been established at the AGF-UP 108. Because PFCP session establishment messages and methods for establishing a PFCP session are generally known, further detailed discussion is omitted.

As discussed above with regard to step S208 in FIG. 2, at S32 the 5G-RG 102 completes registration with the 5GC 110 by exchanging control messages according to the established PFCP session.

At S34, the 5G-RG 102 initiates a service request or establishment of a new PDU session with the 5GC 110 in the same manner as discussed above with regard to step S210 in FIG. 2.

Once having received a PDU session establishment request from the 5GC 110 at S36, the AGF-CP 106 determines that the separate PFCP session model should be used for the requested PDU session at S38. As discussed above with regard to S214, the AGF-CP 106 determines that the separate PFCP session model should be used based on the determination at S26.

At S40 and S42, the AGF 10 establishes a separate PFCP session for the requested PDU session. In at least one example embodiment, the AGF-CP 106 and the AGF-UP 108 exchange PFCP session establishment messages for the requested PDU session. In more detail, for example, once having established the new PFCP session at the AGF-CP 106, at S40 the AGF-CP 106 sends a PFCP session establishment request message (PFCP Session Est. Req.) to the AGF-UP 108. Based on the PFCP session establishment request message, the AGF-UP 108 establishes the new PFCP session for the requested PDU session at the AGF-UP 108. At S42, the AGF-UP 108 then sends a PFCP session establishment response message (PFCP Session Est. Resp.) to the AGF-CP 106 indicating that the new PFCP session has been established at the AGF-UP 108. As mentioned above, because PFCP establishment messages and methods for establishing PFCP sessions are generally known, further detailed discussion is omitted.

As discussed above with regard to step S218, at S44 the AGF-CP 106 outputs a PDU session establishment response message (PDU Session Est. Resp.) to the 5GC 110 once the separate PFCP session is established.

As discussed above with regard to step S220, at S46 the 5G-RG 102 completes establishment of the requested PDU session with the 5GC 110 and obtains the required IP address(es) and prefix(es) for the PDU session from the 5GC 110.

As mentioned above with regard to FIG. 2, once the PDU session between the 5G-RG 102 and the 5GC 110 has been established, the AGF 10 facilitates access to the 5GC 110 by the 5G-RG 102 according to the established PFCP sessions (sets of forwarding rules) for the control messages and the requested PDU session.

According to one or more example embodiments, S38-S46 may be performed for each PDU session request form the 5GC 110. Consequently, a separate PFCP session may be created for each PDU session between the 5G-RG 102 and the 5GC 110.

FIG. 4 is a signal flow diagram illustrating a method for network access utilizing the combined PFCP session model, according to example embodiments.

The method shown in FIG. 4 is similar to the method shown in FIG. 3, and thus, only the differences between these methods will be discussed for the sake of brevity. In more detail, each of S20, S22, S28, S30, S32, S34, S36, S44 and S46 may be the same or substantially the same as that discussed above with regard to FIG. 3. Thus, a detailed discussion of these steps will be omitted.

Referring to FIG. 4, at S260, after and/or in response to receiving the initiation message via the CPR interface, the AGF-CP 106 performs the pre-authentication discussed above with regard to step S203 in FIG. 2 and determines that the combined PFCP session model-rather than the separate PFCP session model as in FIG. 3—should be used for network access by the 5G-RG 102 to the 5GC 110 as discussed above with regard to step S204 in FIG. 2.

Moving to S380, once having received a PDU session establishment request from the 5GC 110 at S36, the AGF-CP 106 determines that the combined PFCP session model should be used for the requested PDU session at S380. As discussed above with regard to S214 in FIG. 2, the AGF-CP 106 determines that the combined PFCP session model should be used based on the determination at S260.

At S400 and S420, as discussed above with regard to step S222 in FIG. 2, the AGF 10 modifies the PFCP session established at S28 and S30 to add a set of forwarding rules to allow data forwarding for the requested PDU session, such that the modified PFCP session (e.g., single modified PFCP session for the new PDU session hosts a set of forwarding rules for forwarding control messages between the AGF-CP 106 and the AGF-UP 108 and a set of forwarding rules for forwarding data traffic between the AGF-CP 106 and the AGF-UP 108. For example, the AGF-CP 106 and the AGF-UP 108 exchange PFCP session modification messages for the requested PDU session to add a set of forwarding rules for the requested PDU session. In more detail, once having modified the PFCP session as needed to add the necessary set of forwarding rules at the AGF-CP 106, at S400 the AGF-CP 106 sends a PFCP session modification request message (PFCP Session Mod. Req.) to the AGF-UP 108. Based on the PFCP modification request message, the AGF-UP 108 modifies the PFCP session as needed to add the necessary set of forwarding rules at the AGF-UP 108. The AGF-UP 108 then sends a PFCP session modification response message (PFCP Session Mod. Resp.) to the AGF-CP 106 at S420, indicating that the PFCP session has been modified at the AGF-UP 108. Because PFCP modification messages and methods for modifying PFCP sessions are generally known, further detailed discussion is omitted.

As mentioned above with regard to FIG. 2, once the PDU session between the 5G-RG 102 and the 5GC 110 has been established, the AGF 10 facilitates access to the 5GC 110 by the 5G-RG 102 according to the combined PFCP session including sets of forwarding rules for the control messages and data traffic for the requested PDU session.

According to one or more example embodiments, S380, S400, S420, S44 and S46 may be performed for each PDU session request from the 5GC 110 when utilizing the combined PFCP session model. Consequently, a combined PFCP session (e.g., single combined PFCP session) may include sets of forwarding rules for control messages and data traffic for each of one or more PDU sessions between the 5G-RG 102 and the 5GC 110.

Figure 5:
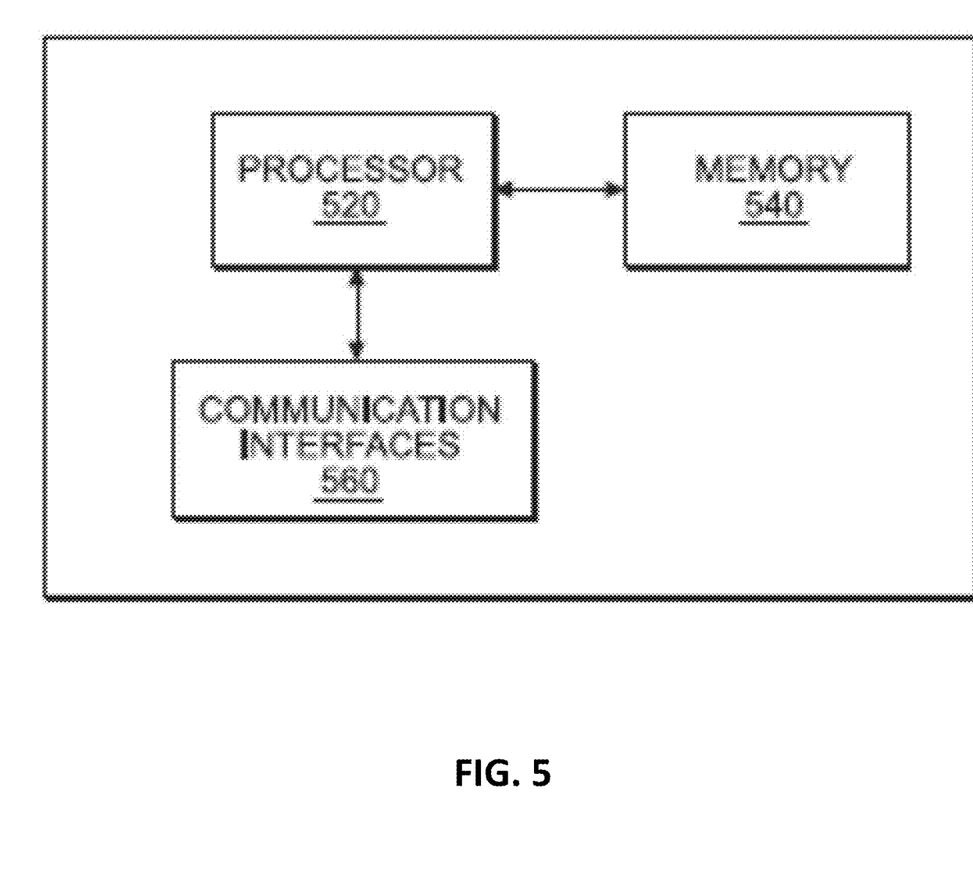
FIG. 5 illustrates an example embodiment of a network node at which an Aggregate Gateway Function (AGF) may be implemented.

FIG. 5 illustrates an example embodiment of a network node at which an AGF may be implemented. The structure shown in FIG. 5 may also be representative of other network elements, such as residential gateways, CPEs, etc.

As shown, the network node includes: a memory 540; a processor 520 connected to the memory 540; various communication interfaces 560 connected to the processor 520. The various interfaces 560 may constitute a transceiver for transmitting/receiving data from/to other network elements (e.g., network nodes, routers, nodes, servers, BNGs, etc.). As will be appreciated, depending on the implementation of the network node, the network node may include many more components than those shown in FIG. 5. However, it is not necessary that all of these generally conventional components be shown in order to disclose the illustrative example embodiment. For example purposes, the example embodiment shown in FIG. 5 will be discussed with regard to a processor 520. However, it should be understood that the network node shown in FIG. 5 may include one or more processors or other processing circuitry, such as one or more Application Specific Integrated Circuits (ASICs).

The memory 540 may be a computer readable storage medium that generally includes a random access memory (RAM), read only memory (ROM), and/or a permanent mass storage device, such as a disk drive. The memory 540 also stores an operating system and any other routines/modules/applications for providing the functionalities of the network node (including UPF, CPF, MPF, etc.) to be executed by the processor 520. These software components may also be loaded from a separate computer readable storage medium into the memory 540 using a drive mechanism (not shown). Such separate computer readable storage medium may include a disc, tape, DVD/CD-ROM drive, memory card, or other like computer readable storage medium (not shown). In some example embodiments, software components may be loaded into the memory 540 via one of the various interfaces 560, rather than via a computer readable storage medium.

The processor 520 or other processing circuitry may be configured to carry out instructions of a computer program by performing the arithmetical, logical, and input/output operations of the system. Instructions may be provided to the processor 520 by the memory 540.

The various communication interfaces 560 may be wired and may include components that interface the processor 520 with the other input/output components. As will be understood, the various interfaces 560 and programs stored in the memory 540 to set forth the special purpose functionalities of the network node will vary depending on the implementation of the network node.

The interfaces 560 may also include one or more user input devices (e.g., a keyboard, a keypad, a mouse, or the like) and user output devices (e.g., a display, a speaker, or the like).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network nodes, BNGs, servers, ANs, CPEs, routers, or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network nodes, BNGs, servers, ANs, CPEs, routers, or other network elements, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for network access by a residential gateway in a control and user plane separation architecture, the control and user plane separation architecture including a control plane and a separate user plane, and the residential gateway configured for both wired and wireless communication via the network, the method comprising:
    establishing, via an aggregate gateway function, a packet forwarding control protocol session between the residential gateway and the network, the packet forwarding control protocol session hosting (i) a first set of forwarding rules for forwarding control messages between the control plane and the separate user plane and (ii) at least one second set of forwarding rules for forwarding data traffic between the control plane and the separate user plane; and
    facilitating, via the aggregate gateway function, network access by the residential gateway according to the packet forwarding control protocol session, wherein
        the aggregate gateway function includes an aggregate gateway function user plane and an aggregate gateway function control plane, and
        the establishing includes modifying the packet forwarding control protocol session to add the at least one second set of forwarding rules by exchanging packet forwarding control protocol session modification messages between the aggregate gateway function user plane and the aggregate gateway function control plane, the exchanging the packet forwarding control protocol session modification messages including
            sending a packet forwarding control protocol session modification request message from the aggregate gateway function control plane to the aggregate gateway function user plane upon receipt of a packet data unit session request message, the packet data unit session request message requesting a packet data unit session between the residential gateway and the network, and
            sending a packet forwarding control protocol session modification response message from the aggregate gateway function user plane to the aggregate gateway function control plane.

2. The method of claim 1, further comprising:
    performing pre-authentication of the residential gateway to the network after receipt of an initiation message from the residential gateway; and wherein
    the establishing establishes the packet forwarding control protocol session after the residential gateway has been pre-authenticated to the network.

3. The method of claim 2, further comprising:
    determining, after the pre-authentication, that a single packet forwarding control protocol session is to be used to host the first set of forwarding rules and the at least one second set of forwarding rules; and wherein
    the establishing establishes the packet forwarding control protocol session after determining that the single packet forwarding control protocol session is to be used.

4. The method of claim 1, wherein the establishing further comprises:
    establishing the packet forwarding control protocol session for hosting the first set of forwarding rules.

5. The method of claim 1, wherein the modifying modifies the packet forwarding control protocol session upon receipt of a packet data unit session request message, the packet data unit session request message requesting a packet data unit session between the residential gateway and the network.

6. The method of claim 1, wherein
    the first set of forwarding rules is for forwarding the control messages between the aggregate gateway function user plane and the aggregate gateway function control plane.

7. The method of claim 1, wherein the at least one second set of forwarding rules is for forwarding the data traffic between the aggregate gateway function user plane and the aggregate gateway function control plane.

8. The method of claim 4, wherein
    the establishing the packet forwarding control protocol session for hosting the first set of forwarding rules includes exchanging packet forwarding control protocol session establishment messages between the aggregate gateway function user plane and the aggregate gateway function control plane.

9. The method of claim 1, further comprising:
    establishing at least one packet data unit session for network access by the residential gateway after modifying the packet forwarding control protocol session.

10. The method of claim 1, further comprising:
    obtaining, from the network, IP addresses and prefixes for network access by the residential gateway.

11. A network element to facilitate network access by a residential gateway in a control and user plane separation architecture, the control and user plane separation architecture including an aggregate gateway function having a control plane and a separate user plane, and the residential gateway configured for both wired and wireless communication via the network, the network element comprising:
    at least one processor; and
    at least one memory including computer program code, the at least one memory and the computer program code configured to, with the at least one processor, cause the network element to
        establish a packet forwarding control protocol session between the residential gateway and the network, the packet forwarding control protocol session hosting (i) a first set of forwarding rules for forwarding control messages between the control plane and the separate user plane and (ii) at least one second set of forwarding rules for forwarding data traffic between the control plane and the separate user plane, and facilitate network access by the residential gateway according to the packet forwarding control protocol session, wherein the aggregate gateway function includes an aggregate gateway function user plane and an aggregate gateway function control plane, and the establishing includes modifying the packet forwarding control protocol session to add the at least one second set of forwarding rules by exchanging packet forwarding control protocol session modification messages between the aggregate gateway function user plane and the aggregate gateway function control plane, the exchanging the packet forwarding control protocol session modification messages including sending a packet forwarding control protocol session modification request message from the aggregate gateway function control plane to the aggregate gateway function user plane upon receipt of a packet data unit session request message, the packet data unit session request message requesting a packet data unit session between the residential gateway and the network, and sending a packet forwarding control protocol session modification response message from the aggregate gateway function user plane to the aggregate gateway function control plane.

12. The network element of claim 11, wherein the at least one memory and the computer program code are configured to, with the at least one processor, cause the network element to perform pre-authentication of the residential gateway to the network after receipt an initiation message from the residential gateway, and establish the packet forwarding control protocol session after the residential gateway has been pre-authenticated to the network.

13. The network element of claim 12, wherein the at least one memory and the computer program code are configured to, with the at least one processor, cause the network element to determine, after the pre-authentication, that a single packet forwarding control protocol session is to be used to host the first set of forwarding rules and the at least one second set of forwarding rules, and establish the packet forwarding control protocol session after determining that the single packet forwarding control protocol session is to be used.

14. The network element of claim 11, wherein the at least one memory and the computer program code are configured to, with the at least one processor, cause the network element to further establish the packet forwarding control protocol session by establishing the packet forwarding control protocol session for hosting the first set of forwarding rules.

15. The network element of claim 11, wherein the modifying modifies the packet forwarding control protocol session upon receipt of a packet data unit session request message, the packet data unit session request message requesting a packet data unit session between the residential gateway and the network.

16. The network element of claim 11, wherein
the first set of forwarding rules is for forwarding the control messages between the aggregate gateway function user plane and the aggregate gateway function control plane.

17. The network element of claim 11, wherein the at least one second set of forwarding rules is for forwarding the data traffic between the aggregate gateway function user plane and the aggregate gateway function control plane.

18. The network element of claim 14, wherein
the establishing the packet forwarding control protocol session for hosting the first set of forwarding rules includes exchanging packet forwarding control protocol session establishment messages between the aggregate gateway function user plane and the aggregate gateway function control plane.

19. A non-transitory computer-readable storage medium storing computer-executable instructions that, when executed by one or more processors at a network element including an aggregate gateway function, cause the network element to perform a method for network access by a residential gateway in a control and user plane separation architecture, the control and user plane separation architecture including a control plane and a separate user plane at the aggregate gateway function, and the residential gateway configured for both wired and wireless communication via the network, the method comprising:

establishing a packet forwarding control protocol session between the residential gateway and the network, the packet forwarding control protocol session hosting (i) a first set of forwarding rules for forwarding control messages between the control plane and the separate user plane and (ii) at least one second set of forwarding rules for forwarding data traffic between the control plane and the separate user plane; and facilitating network access by the residential gateway according to the packet forwarding control protocol session, wherein the aggregate gateway function includes an aggregate gateway function user plane and an aggregate gateway function control plane, and the establishing includes modifying the packet forwarding control protocol session to add the at least one second set of forwarding rules by exchanging packet forwarding control protocol session modification messages between the aggregate gateway function user plane and the aggregate gateway function control plane, the exchanging the packet forwarding control protocol session modification messages including sending a packet forwarding control protocol session modification request message from the aggregate gateway function control plane to the aggregate gateway function user plane upon receipt of a packet data unit session request message, the packet data unit session request message requesting a packet data unit session between the residential gateway and the network, and sending a packet forwarding control protocol session modification response message from the aggregate gateway function user plane to the aggregate gateway function control plane.

* * * * *